(12) United States Patent
Klinkner et al.

(10) Patent No.: US 8,478,737 B2
(45) Date of Patent: Jul. 2, 2013

(54) SEGMENTATION OF SEARCH TOPICS IN QUERY LOGS

(75) Inventors: Kristina Lisa Klinkner, Pittsburgh, PA (US); Rosie Jones, Pasadena, CA (US)

(73) Assignee: Yahoo! Inc., Sunnyvale, CA (US)

(*) Notice: Subject to any disclaimer, the term of this patent is extended or adjusted under 35 U.S.C. 154(b) by 97 days.

(21) Appl. No.: 12/965,396

(22) Filed: Dec. 10, 2010

(65) Prior Publication Data

US 2011/0078147 A1    Mar. 31, 2011

Related U.S. Application Data

(62) Division of application No. 11/957,150, filed on Dec. 14, 2007, now Pat. No. 7,877,389.

(51) Int. Cl.
*G06F 17/30* (2006.01)

(52) U.S. Cl.
USPC .......................................................... 707/713

(58) Field of Classification Search
None
See application file for complete search history.

(56) References Cited

U.S. PATENT DOCUMENTS

| | | | |
|---|---|---|---|
| 2003/0074368 A1 | 4/2003 | Schuetze et al. | |
| 2004/0169679 A1* | 9/2004 | Parikh et al. | 345/738 |
| 2005/0055321 A1* | 3/2005 | Fratkina et al. | 706/45 |
| 2005/0216443 A1 | 9/2005 | Morton et al. | |
| 2006/0173841 A1* | 8/2006 | Bill | 707/6 |
| 2007/0010942 A1* | 1/2007 | Bill | 701/209 |
| 2007/0100867 A1 | 5/2007 | Celik et al. | |
| 2008/0065685 A1 | 3/2008 | Frank | |
| 2008/0168093 A1* | 7/2008 | De Marcken | 707/104.1 |
| 2008/0201302 A1 | 8/2008 | Kimchi et al. | |

OTHER PUBLICATIONS

Jansen et al., "*Defining a Session on Web Search Engines*", Wiley InterScience, 2007 Wiley Periodicals, Inc., Published online Feb. 27, 2007 in Wiley InterScience (www.interscience.wiley.com), Journal of the American Society for Information Science and Technology, 58(6):862-871.

Spink et al., "*Multitasking during Web search sessions*", Science Direct, Information Processing and Management 42, 264-275, 2006.

Radlinski et al., "Query Chains: Learning to Rank from Implicit Feedback", KDD '05, Aug. 21-24, 2005.

Spink et al., "*Use of query reformulation and relevance feedback by Excite users*", Internet Research Electronic Networking Applications and Policy, vol. 10, No. 4, pp. 317-328, Nov. 4, 2000.

Silverstein, "*Analysis of a Very Large Web Search Engine Query Log*", from SIGIR Forum, vol. 33, No. 1, 1999, p. 6-12.

(Continued)

*Primary Examiner* — Wilson Lee
(74) *Attorney, Agent, or Firm* — Brinks Hofer Gilson & Lione (57) ABSTRACT

A system identifies the tasks that a user is attempting to perform when submitting a series of search queries. A task may be categorized hierarchically into a mission and a goal in order to classify a series of queries and determine the user's intent. The user's mission may be an extended task and the user's goal may be a specific task. A pair of queries may be analyzed to determine whether those queries have the same mission and/or the same goal. For a series of queries, boundaries may be identified between the queries to identify where a user has changed her goal or changed her mission. The identification of goals, missions and boundaries may be automated based on an analysis of features of the queries that are compared.

15 Claims, 8 Drawing Sheets

OTHER PUBLICATIONS

Özmutlu et al., *"Investigating the Performance of Automatic New Topic Identification Across Multiple Datasets"* from National Young Researchers Career Development Project 2005: Fund No. 105M320: "Application of Web Mining and Industrial Engineering Techniques in the Design of New Generation Intelligent Information Retrieval Systems".

Lau et al., *"Patterns of Search: Analyzing and Modeling Web Query Refinement"*, Department of Computer Science & Engineering, University of Washington, Seattle, WA, USA, Decision Theory & Adaptive Systems, Microsoft Research, Redmond, WA, USA, from Proceedings of the Seventh International Conference on User Modeling. ACM Press, 1998 http://citeseer.ist.psu.edu/695434.html.

* cited by examiner

Figure 12

SEGMENTATION OF SEARCH TOPICS IN QUERY LOGS

PRIORITY

This Application is a Divisional of U.S. application Ser. No. 11/957,150, filed on Dec. 14, 2007, entitled "SEGMENTATION OF SEARCH TOPICS IN QUERY LOGS," now U.S. Pat. No. 7,877,389, the entire disclosure of which is incorporated by reference.

BACKGROUND

Online searching and advertising may be an important source of revenue for enterprises engaged in electronic commerce. Processes associated with technologies such as Hypertext Markup Language (HTML) and Hypertext Transfer Protocol (HTTP) enable a web page to be configured to display search results and/or advertisements. Online searching is a common way for consumers to locate information, goods, or services on the Internet. Consumers use the Internet and search engines to find information and make decisions among online entities such as websites, online companies, or online services, independent of geographic constraints.

A consumer may use an online search engine to type in one or more queries or keywords to search for other pages or web sites with information related to the query. Search results and/or advertisements are displayed after the query. Consumers may reformulate the query based on observing the search results to the initial query. This reformulation process may result in a series of queries that are related to a single need or consumer intent. The search results may be chosen and displayed based on the presumed intent of the consumer performing the search. Identification of a consumer's intent may result in improved targeting of advertisements to the consumer, as well as improved relevance of the search results that are displayed. The intent of a consumer in searching may be spread over multiple queries, such that the consumer performs several searches for a single or related purpose. It may be beneficial to identify a consumer's intent over multiple search queries.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Although frequent analysis of web search relevance and performance is conducted by considering the query as the unit of search engine interaction, users may query search engines in order to accomplish tasks at a variety of granularities. Brief tasks may comprise only a single goal, such as finding a particular website, while others may be missions with multiple goals. Thus users' search tasks may have a hierarchical structure with multiple levels. The properties of this hierarchy, as seen in a random sample of user sessions from a major web search engine's log, may be analyzed and annotated by human editors to mark goals and missions. The annotation may be used for the automated segmentation of sessions into goals and missions, based on features of the users' query streams. Accordingly, the identification of missions and goals within user sessions may be used to determine user tendencies and user intent.

By way of introduction, the embodiments described below include a system and method for the segmentation of search topics in search queries. The embodiments relate to identification of a user's mission(s) and/or goal(s) in performing a series of search queries. In particular, boundaries in a series of queries may be identified to segment various goals and/or missions. Segmenting or segmentation may refer to the identification of a user's informational needs (or intent), such as through identifying goals and/or missions. The segmentation may further include an identification of boundaries which define changes in the user's informational needs. In one example, a user's queries may be monitored over one or more continuous or disjoint time periods (i.e. a session), such as several days, to determine which queries are related and determine the intent of the user during the monitored time period(s). The session may cover a set of related information needs taking a user from the early stages of planning through the execution. For example, a user planning and arranging a vacation may search for information related to locales, hotels, and/or airlines, as well as prices and reviews for each. Accordingly, several information needs may be combined in a task which the user may like to complete successfully. The identification of sets of queries with the same (or related) information-seeking intent may be used to evaluate the performance of a web search engine from the user's point of view. It may be used to measure success and failure at the level of user intent, or evaluate user effort in terms of queries issued or time spent on task as the user attempts to satisfy an information need. Improved identification of user intent may be used to improve the search result listing as well as target advertisements based on that user intent.

The searching performed by a user may be viewed as a hierarchy, which may involve multiple sessions. A session may refer to user activity within a fixed time period. A session may be a slice of time in which a user is utilizing a search engine to perform searches and view results. The session may include a series of queries within a time period. In one example, a user may spend 30 minutes searching the web for a particular topic and that time slice may be defined as a session. Alternatively, a session may be a longer period of time over which a user's queries are analyzed, such as several days. A session may cover a period of time that includes no activity for the user. For example, over a three day time period, there may be only 30 minutes of user activity that is measured in that session.

A session may be analyzed to determine the mission(s) and/or goal(s) based on the user activity. A mission may be an extended information need. A mission may have a multiple goals. A goal may be an atomic information need, which results in one or more queries. A goal may include a group of related queries to accomplish a single discrete task. The queries may not be contiguous, but may be interleaved with queries from other goals. In one embodiment, a goal may have multiple queries and a mission may have multiple goals. In the example described above, the planning of a vacation may be a mission, whose goals include searching for information related to locales, hotels, and/or airlines. A search for a hotel may be a separate goal from a search for airfare, but they may be related to the same mission. The identification of missions and goals may be utilized for the segmentation of search sessions as described below.

The hierarchical structure of user intent may include multiple levels of intent. In one embodiment, a first level of intent may be a general intent or an extended information need, such as a mission. A second level of intent may include a specific intent or a discrete informational need, such as a goal. In alternative embodiments, the hierarchical structure of intent may include more than two levels.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments.

Figure 1:
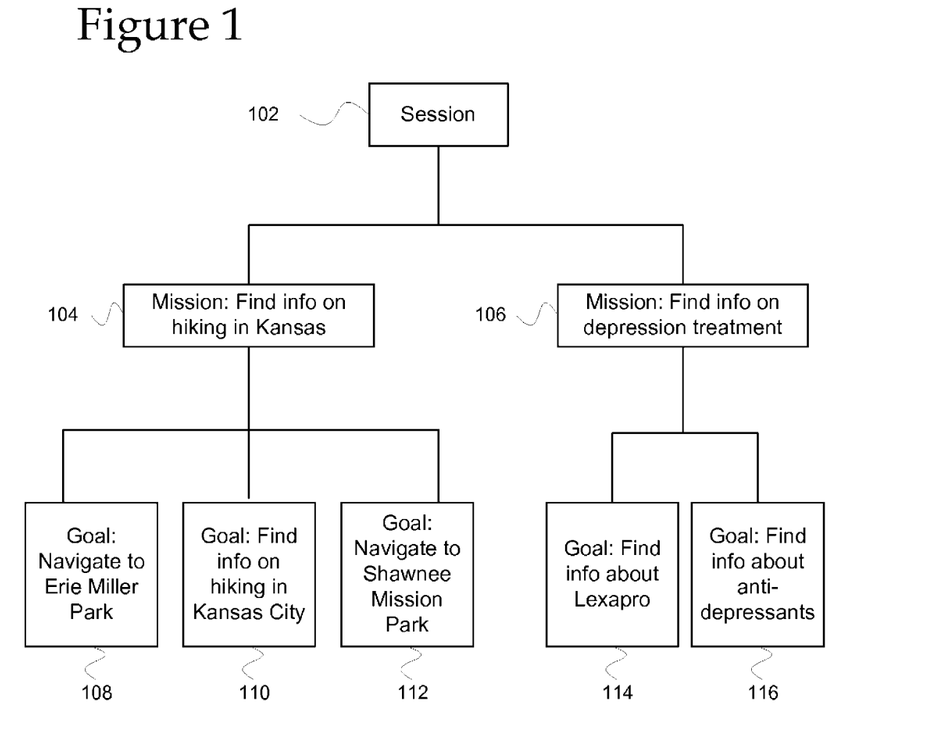
FIG. 1 is a block diagram of a searching hierarchy.

FIG. 1 is a block diagram of a searching hierarchy. The hierarchy may involve multiple sessions although FIG. 1 illustrates one session 102. The session 102 includes two missions. The first mission 104 is finding information on hiking in Kansas. The second mission 106 is finding information on depression treatment. The first mission 104 may include three goals. In other words, as part of the mission of finding information on hiking in Kansas, a user may have three discrete goals for searching. The first goal 108 may be navigate to Erie Miller Park. The second goal 110 may be to find information on hiking in Kansas City. The third goal 112 may be to navigate to Shawnee Mission Park. The goals 108, 110, 112 may each include one or more searches and are part of the mission 104 for finding information on hiking in Kansas. The second mission 106 for finding information on depression treatment may include two goals. The first goal 114 may be finding information about Lexapro® and the second goal 116 may be to find information about anti-depressants. The goals 114, 116 may involve distinct searches, but are related to the mission 106. FIG. 1 is one example of a hierarchical structure of a session that may be analyzed to identify missions and to identify the goals of those missions. As shown, FIG. 1 illustrates a two level hierarchy of searching intent, where one level is referred to as a mission and a second level is referred to as a goal.

Table 1 illustrates a sample of a sequence of user queries annotated as goals and missions:

TABLE 1

| QUERY & TIMESTAMP | GOAL | MISSION | DESCRIPTION |
|---|---|---|---|
| MISSION 1: Find info on hiking opportunities in and around San Francisco | | | |
| hiking; san francisco<br>Tue Apr 17 23:43:17 2007 (7 m 41 s) | 1 | 1 | GOAL 1: Find info on hiking trails in San Francisco and the Bay Area |
| hiking; san francisco bay area<br>Tue Apr 17 23:47:34 2007 (4 m 17 s) | 1 | 1 | |
| ano nuevo state reserve<br>Tue Apr 17 23:52:33 2007 (4 m 59 s) | 2 | 1 | GOAL 2: Navigate to Ano Nuevo State Reserve and find mileage |
| ano nuevo state reserve; miles<br>Wed Apr 18 00:00:27 2007 (7 m 54 s) | 2 | 1 | |
| nature trails; san francisco<br>Wed Apr 18 00:04:01 2007 (3 m 34 s) | 1 | 1 | |
| lobos creek trail<br>Wed Apr 18 00:20:16 2007 (16 m 15 s) | 3 | 1 | GOAL 3: Navigate to Lobos Creek Trail |
| china camp state park; san rafael<br>Wed Apr 18 00:20:19 2007 (0 m 3 s) | 4 | 1 | GOAL 4: Navigate to China Camp, San Rafael and find out about distances |
| china camp; miles<br>Wed Apr 18 00:22:54 2007 (2 m 35 s) | 4 | 1 | |
| hike; san francisco<br>Wed Apr 18 00:42:56 2007 (20 m 2 s) | 1 | 1 | |
| fort funston<br>Wed Apr 18 00:46:15 2007 (3 m 19 s) | 5 | 1 | GOAL 5: Navigate to Fort Funston |
| MISSION 2: Find info on car maintenance and repair | | | |
| brake pads<br>Wed Apr 18 03:36:47 2007 (1 h 51 m 26 s) | 6 | 2 | GOAL 6: Find info on brake pads |
| auto repair 7 2<br>Wed Apr 18 03:53:23 2007 (16 m 36 s) | 7 | 2 | GOAL 7: Find info on an auto body shop in San Francisco |
| auto body shop<br>Wed Apr 18 04:01:23 2007 (8 m 0 s) | 7 | 2 | |
| batteries<br>Wed Apr 18 04:04:54 2007 (3 m 31 s) | 8 | 2 | GOAL 8: Find info on purchasing a car battery |
| car batteries<br>Wed Apr 18 04:05:23 2007 (0 m 29 s) | 8 | 2 | |

TABLE 1-continued

| QUERY & TIMESTAMP | GOAL | MISSION DESCRIPTION |
|---|---|---|
| auto body shop; san francisco<br>Wed Apr 18 04:07:31 2007 (2 m 8 s) | 7 | 2 |
| buy car battery online free shipping<br>Wed Apr 18 04:11:04 2007 | 8 | 2 |

As shown in Table 1, a user performed a series of queries over a session. Those queries were related to two missions. The first mission was hiking opportunities in San Francisco and the second mission was finding information on car maintenance and repair. The first mission included ten queries with five goals identified. The second mission included seven queries with three goals identified. Table 1 is merely exemplary of a series of queries and the identification of missions and goals for that series of queries. As described below, the identification of goals and missions from a series of queries may be performed by automatically with a segmenter by analyzing different features of the queries.

The automatic segmentation of a session may include identifying a mission and goal for each query as well as identifying boundaries between missions and boundaries between goals. As shown in Table 1, a user may interweave searches from various goals and missions. The segmentation of queries by identifying boundaries between missions and goals may help assess user engagement and satisfaction. For example, standard metrics of user involvement with a search engine or portal emphasize visits or time spent. However, each page view may constitute small pieces of the same information need and each visit may encompass a larger task. Quantification of the number and type of information needs or tasks a user addresses via a website, may provide insight into the importance of the site to that user, and provide a measure of the accuracy with which the search engine is meeting the user's informational needs. Segmenting the query stream in keeping with the user's objectives may signify the relationship among queries given the user's intent or signify how queries are related in context.

Figure 2:
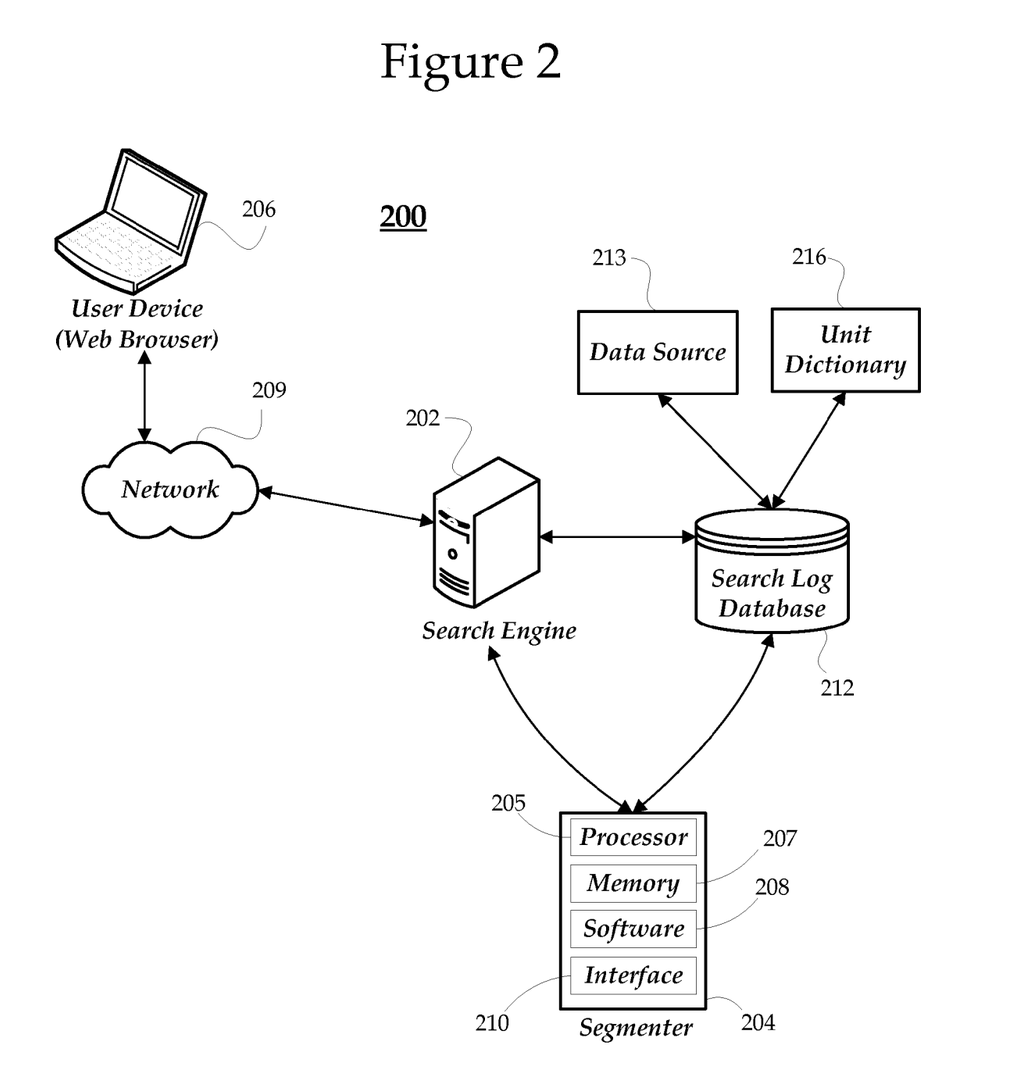
FIG. 2 is a block diagram of an exemplary network system.

FIG. 2 provides a simplified view of a network system 200 in which the present embodiments may be implemented. Not all of the depicted components may be required, however, and some embodiments of the invention may include additional components not shown in the figure. Variations in the arrangement and type of the components may be made without departing from the spirit or scope of the claims as set forth herein. Additional, different or fewer components may be provided.

FIG. 2 is a block diagram illustrating an embodiment of an exemplary network system 200 for segmentation of search topics from search queries. In particular, system 200 includes a segmenter 204 that may receive and analyze search queries for identifying missions and/or goals and identifying their boundaries. A user device 206 is coupled with a search engine 202 through a network 209. The search engine 202 is coupled with a search log database 212, and both are coupled with the segmenter 204. The search log database 212 is coupled with a data source 213. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein.

The user device 206 may be a computing device for a user to connect to a network 209, such as the Internet. Examples of a user device include but are not limited to a personal computer, personal digital assistant ("PDA"), cellular phone, or other electronic device. The user device 206 may be configured to access other data/information in addition to web pages over the network 209 with a web browser, such as INTERNET EXPLORER® (sold by Microsoft Corp., Redmond, Wash.). The user device 206 may enable a user to view pages over the network 209, such as the Internet.

The user device 206 may be configured to allow a user to interact with the search engine 202, the search log database 212, or other components of the system 200. In one embodiment, the user device 206 may receive and display a site or page provided by the search engine 202. The user device 206 may include a keyboard, keypad or a cursor control device, such as a mouse, or a joystick, touch screen display, remote control or any other device operative to allow a user to interact with the page(s) provided by the search engine 202.

The search engine 202 is coupled with the user device 206 through the network 209, as well as being coupled with the segmenter 204 and/or the search log database 212. In one embodiment, the search engine 202 is a web server. The search engine 202 may provide a site or a page over a network, such as the network 209 or the Internet. A site or page may refer to a web page or a series of related web pages which may be received or viewed over a network. The site or page is not limited to a web page, and may include any information accessible over a network that may be displayed at the user device 206. A user of the user device 206 may access a page provided by the search engine 202 over the network 209. As described below, the page provided by the search engine 202 may be a search page that receives a search query from the user device 206 and provides search results that are based on the received search query.

The search engine 202 may include an interface, such as a web page, e.g., the web page which may be accessed on the World Wide Web at yahoo.com (operated by Yahoo! Inc., in Sunnyvale, Calif.), which is used to search for pages which are accessible via the network 209. The user device 206, autonomously or at the direction of the user, may input a search query (also referred to as a user query, original query, search term or a search keyword) for the search engine 202. A single search query may include multiple words or phrases. The search engine 202 may perform a search for the search query and display the results of the search on the user device 206. The results of a search may include a listing of related pages or sites that is provided by the search engine 202 in response to receiving the search query. The listing of related pages or sites on the search results page may be listed according to relevancy, with the first search result being deemed more relevant to the search query.

In one embodiment, the search results page may include advertisements that are related to the search query. The advertisements may be targeted based on the search query. Identification of the mission and/or goal of a user performing search queries may be utilized for improved targeting of advertisements. For example, if a user searching for airfare is known to have a mission of finding a vacation location, then the advertisements for the airfare search results may display vacation related advertisements in addition to airfare.

The search log database 212 includes records or logs of at least a subset of the search queries entered in the search engine 202 over a period of time and may also be referred to as a search query log, search term database, keyword database or query database. The search log database 212 may include search queries from any number of users over any period of time. Alternatively, the search log database 212 may include records or logs of a subset of the queries or requests for data entered at the search engine 202 over various sessions or periods of time. The stored search queries may be organized by user and based on sessions of varying amounts of time. For example, a user's queries over a session of three days may be stored.

The search log database 212 may also be coupled with a data source 213. The data source 213 may be an internal source of data, an external source of search data, or a combination of the two. An external data source may include search results from other search engines or other sources. For example, a search engine other than search engine 202 may be an external data source and provide search logs to the search log database 212. An internal data source may include search data or other data from the search engine 202. Other data may include other searching or web browsing tendencies identified by the search engine 202.

In one embodiment, the search queries may be stored as or identified by units. Units may also be referred to as concepts or topics and are sequences of one or more words that appear in search queries. For example, the search query "New York City law enforcement" may include two units, e.g. "New York City" may be one unit and "law enforcement" may be another unit. A unit is a phrase of common words that identify a single concept. As another example, the search query "Chicago art museums" may include two units, e.g. "Chicago" and "art museums." The "Chicago" unit is a single word, and "art museums" is a two-word unit. Units identify common groups of keywords to maximize the efficiency and relevance of search results. The categorization of search queries into units may be used to analyze the search queries received by the search engine 202. A search query may be broken into units that are analyzed by a segmenter for identifying missions and/or goals. In one embodiment, past search queries are stored in the search log database 212 as well as any associated missions and/or goals that were identified to be associated with the queries.

In one embodiment, the search engine 202 and/or the search log database 212 may be coupled with the segmenter 204. The segmenter 204 receives a user query from the user device 206 and compares/identifies a mission or goal associated with that query. Further, the segmenter may analyze a session of search queries from a user that are stored in the search log database 212 to determine boundaries between missions and goals from the user's queries or to identify whether queries have the same missions and/or goals.

The segmenter 204 may be a computing device that includes a processor 205, memory 207, software 208 and an interface 210. The segmenter 204 may be a separate component from the search engine 202, or may be combined with the search engine 202. The interface 210 may communicate with the search engine 202 and/or the search log database 212. In one embodiment, the interface 210 may include a user interface configured to allow a user to interact with any of the components of the segmenter 204.

The processor 205 in the segmenter 204 may include a central processing unit (CPU), a graphics processing unit (GPU), a digital signal processor (DSP) or other type of processing device. The processor 205 may be a component in any one of a variety of systems. For example, the processor 205 may be part of a standard personal computer or a workstation. The processor 205 may be one or more general processors, digital signal processors, application specific integrated circuits, field programmable gate arrays, servers, networks, digital circuits, analog circuits, combinations thereof, or other now known or later developed devices for analyzing and processing data. The processor 205 may operate in conjunction with a software program, such as code generated manually (i.e., programmed).

The processor 205 may be coupled with a memory 207, or the memory 207 may be a separate component. The interface 210 and/or the software 208 may be stored in the memory 207. The memory 207 may include, but is not limited to computer readable storage media such as various types of volatile and non-volatile storage media, including to random access memory, read-only memory, programmable read-only memory, electrically programmable read-only memory, electrically erasable read-only memory, flash memory, magnetic tape or disk, optical media and the like. In one embodiment, the memory 207 includes a random access memory for the processor 205. In alternative embodiments, the memory 207 is separate from the processor 205, such as a cache memory of a processor, the system memory, or other memory. The memory 207 may be an external storage device or database for storing recorded image data. Examples include a hard drive, compact disc ("CD"), digital video disc ("DVD"), memory card, memory stick, floppy disc, universal serial bus ("USB") memory device, or any other device operative to store image data. The memory 207 is operable to store instructions executable by the processor 205.

The functions, acts or tasks illustrated in the figures or described herein may be performed by the programmed processor executing the instructions stored in the memory 207. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 205 is configured to execute the software 208. The software 208 may include instructions for analyzing features of search queries to identify boundaries in the missions and/or goals of a user.

The interface 210 may be a user input device or a display. The interface 210 may include a keyboard, keypad or a cursor control device, such as a mouse, or a joystick, touch screen display, remote control or any other device operative to interact with the segmenter 204. The interface 210 may include a display coupled with the processor 205 and configured to display an output from the processor 205. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 205, or as an interface with the software 208 for providing input parameters. In particular, the interface 210 may allow a user to interact with the segmenter 204 to establish the features that are used in identifying missions and/or goals for search queries.

Any of the components in system 200 may be coupled with one another through a network. For example, the segmenter 204 may be coupled with the search engine 202, or search log database 212 via a network. Any of the components in system 200 may include communication ports configured to connect with a network. The present disclosure contemplates a computer-readable medium that includes instructions or receives and executes instructions responsive to a propagated signal, so that a device connected to a network can communicate voice, video, audio, images or any other data over a network. The instructions may be transmitted or received over the network via a communication port or may be a separate component. The communication port may be created in software or may be a physical connection in hardware. The communication port may be configured to connect with a network, external media, display, or any other components in system 200, or combinations thereof. The connection with the network may be a physical connection, such as a wired Ethernet connection or may be established wirelessly as discussed below. Likewise, the connections with other components of the system 200 may be physical connections or may be established wirelessly.

The network or networks that may connect any of the components in the system 200 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or a WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. For example, the search engine 202 may provide pages to the user device 206 over a network, such as the network 209.

The search engine 202, the search log database 212, the segmenter 204, and/or the user device 206 may represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, as discussed above. For example, the user device 206 may be configured to execute a browser application that employs HTTP to request information, such as a web page from the search engine 202. The present disclosure contemplates a computer-readable medium that includes instructions or receives and executes instructions responsive to a propagated signal, so that any device connected to a network can communicate voice, video, audio, images or any other data over a network.

Figure 3:
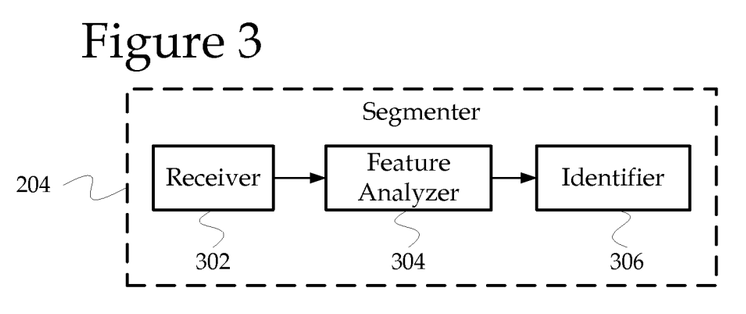
FIG. 3 is a block diagram of a segmenter.

FIG. 3 is a block diagram of a segmenter 204 according to one embodiment. The segmenter 204 may identify the goals and missions of search queries, as well as identify boundaries between goals and missions of those queries. In one embodiment, the segmenter 204 may predict whether a sequential pair of queries includes goal or mission boundaries and whether arbitrary pairs of queries from a single user come from the same or different search goals or missions. The segmenter 204 may include a receiver 302, a feature analyzer 304, and an identifier 306. As shown, the segmenter 204 or any of its components may represent computing devices of various kinds.

The receiver 302 may receive a user query from the search engine 202, which may receive the user query from the user device 206. Alternatively, the receiver 302 may be coupled with the search log database 212 for receiving stored search queries, such as sequential pairs of queries. The search log database 212 may provide stored queries from the search log database 212 for analysis by the segmenter 204.

The feature analyzer 304 is coupled with the receiver 302 for receiving queries to analyze. In particular, the receiver 302 may provide a pair of queries for analysis by the feature analyzer 304. The feature analyzer 304 may compare various features of the queries and based on the comparison, the feature analyzer 304 may identify the goal and/or mission of each query. In addition, the feature analyzer 304 may determine whether a mission boundary or a goal boundary exists between queries.

Figure 4:
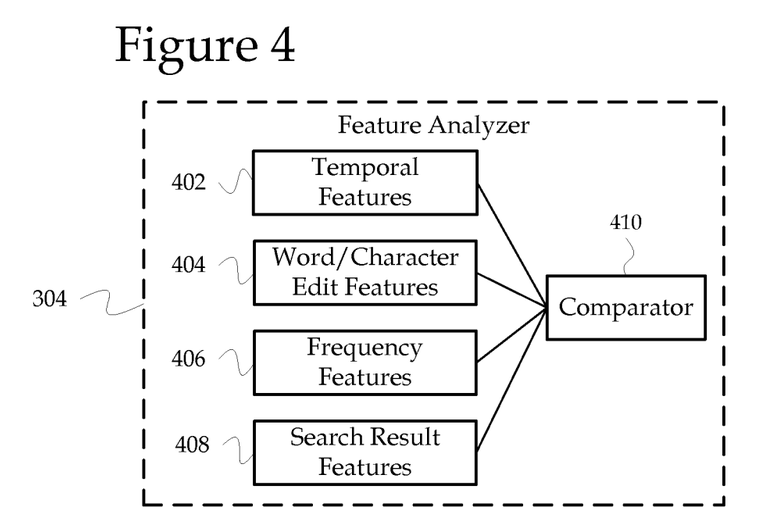
FIG. 4 is a block diagram of a feature analyzer.

FIG. 4 is a block diagram of the feature analyzer 304 according to one embodiment. The feature analyzer 304 may comprise temporal features 402, word/character edit features 404, frequency features 406, and/or search result features 408, which may be coupled with a comparator 410. The features analyzed by the feature analyzer 304 may be used determine similarities between queries for identifying goals and/or missions. When a pair of queries is analyzed, features from both of the queries may be compared by the comparator 410. A mission boundary or a goal boundary may be identified between a pair of queries after the comparator 410 compares analyzed features for each query. Likewise the comparator 410 may compare analyzed features for a pair of queries to determine whether the pair of queries is part of the same goal or part of the same mission.

The feature analyzer 304 may be used to examine the accuracy of several features in isolation for identifying goal and mission boundaries and similarities. The features may be combined using models learned with decision trees and logistic regression. Two different methods that may be used to fit models may be used to predict the boundaries labeled by editors given the features. Thus, for a given feature, the output from the model, per query pair, may be a binary value that specifies whether there is a boundary ("1"), or no boundary ("0"). In the first model, a decision tree may be used to select features, and the cutoff values for each feature. The second model may use logistic regression with a search to select eight features out of eighty, using the Akaike Information Criterion to choose the those features. The features may be tested and compared with real world results to determine which features are accurate for different tasks. As described below with respect to Tables 2-4, a baseline value for each set of features may be determined based on an analysis of a set of search queries that were reviewed by another method, such as with human reviewers. In one embodiment, human reviews may identify boundaries and same-goal/mission queries and the features may be tested to determine which features come closest to the human reviewed identifications.

Figure 5:
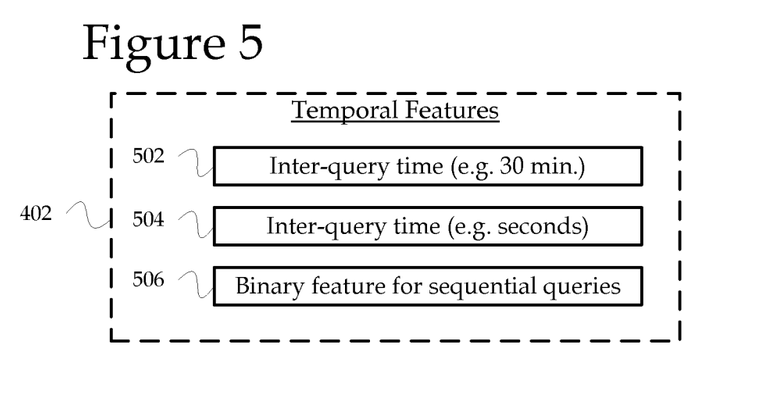
FIG. 5 is a block diagram of exemplary temporal features.

FIG. 5 illustrates exemplary temporal features 402. The temporal features 402 illustrated in FIG. 5 are merely exemplary, and there may be more or fewer temporal features for analyzing and segmenting search queries. The time frame of queries within a single session or within multiple sessions may provide information as to whether queries are part of the same goal or mission. A user may search for information for a period of time before moving to a different topic. Accordingly, the time frame of searches may be indicative of a relationship between searches. For example, when a user who performs ten searches in a two minute period and then ten searches in a two minute period a day later, it is possible that each of the ten searches in the time period are related with either a common goal or a mission, but it may be less likely that searches from the different periods are related.

Time periods of varying lengths between searches and between sessions may be part of an analysis in determining whether queries have similar goals or missions. An inter-query time of 30 minutes 502 may be one example of a temporal feature 402. In one example, users may spend less than 30 minutes searching for a particular mission, so a time gap of greater than 30 minutes may be indicative of a change in the searcher's mission. An inter-query time of less than a minute 504 may be another example of a temporal feature 402. For any given goal, the user may perform searches that are rarely separated by more than one minute. Accordingly, an inter-query time of one minute may be indicative that a searcher has moved on to a different goal. A binary feature for sequential queries 506 may identify when queries are sequential in time with no intervening queries. The sequential queries feature 506 may be used for identifying whether queries have the same goal or mission. Sequential queries may be more likely to be related than non-sequential queries, so query order may be a temporal feature 402 that is considered in determining goals, missions, and/or their boundaries for queries.

An exemplary analysis of the features for predicting goal and mission boundaries, as well as identifying the same goals/missions based on the temporal features may include utilizing a varying time threshold. In particular, varying temporal time periods may be tested for determining accuracy at predicting goal and mission boundaries, as well as identifying the same goal/mission based on time periods between user queries. The time threshold is an amount of time between search queries. As discussed, it may be beneficial to remove repeat queries when determining which features more accurately identify missions/goals.

Figure 6:
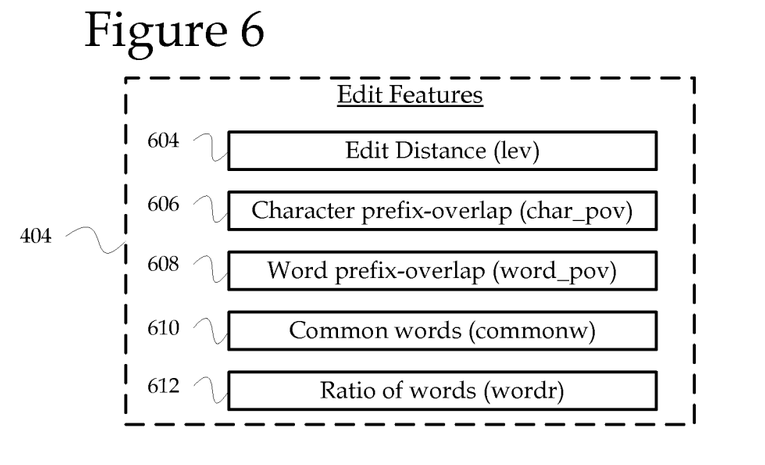
FIG. 6 is a block diagram of exemplary edit features.

Referring back to FIG. 4, an additional type of features to be analyzed is word and character edit features 404. FIG. 6 illustrates exemplary word and character edit features 404. In one embodiment, sequences of queries with words and/or characters in common may be related to one another. Accordingly, a determination of similarities between queries based on the word and character edit features 404 may be utilized to determine common goals and/or missions, as well as boundaries between them. The edit features 404 may include edit distance 604, character prefix-overlap 606, word prefix-overlap 608, common words 610, and/or a ratio of words 612.

The edit distance (lev) 604 may be a measure of the differences of characters between queries. In one embodiment, the edit distance may be a minimum number of edit operations required to transform a first query into a second query. The edit operation may include inserting or deleting a character into a string or replacing a character by another character. The edit distance may be the Levenshtein distance or the Damerau-Levenshtein distance when a transposition of characters counts as a single edit operation. In alternative embodiments, there may be other algorithms that are used for determining the edit distance between queries or there may be more or fewer edit operations that are used in determining an edit distance between queries. An edit distance of zero indicates that the queries are identical, which may be useful for removing repeated queries from the analysis. In one embodiment, the edit distance (lev) 604 may be a normalized Levenshtein edit distance in which the number of character insertions, substitutions, or deletions required to change the first query into the second query are divided by the maximum of the lengths of the two queries.

The character prefix-overlap (char_pov) 606 may be a measure of the similarity between queries of the initial characters of the queries. The character prefix-overlap (char_pov) 606 may measure a difference between the beginning characters in a first and second query. For example, "auto cleaners" and "auto cleaning" have a prefix overlap of "auto clean." The prefix overlap may indicate increased similarity. The word prefix-overlap (word_pov) 608 is similar to the character prefix-overlap, except it measures the similarities in words at the beginning of two queries. The word prefix-overlap (word_pov) 608 may measure a difference between the beginning words in a first and second query.

The number of words in common (commonw) 610 may be a measure of the similarity between queries based on the number of words that the queries have in common. A pair of queries are compared and it is determined how many words are common to both queries. For example, the query "yahoo site" and "yahoo web site" have two words in common. The ratio of words in common (wordr) 612 may be a measure of the similarity between queries based on the number of words that the queries have in common divided by the total number of words, such as by the Jaccard distance. In the example above, "yahoo site" and "yahoo web site" have two words in common between a total of three words, so the ratio of words in common would be two-thirds. The ratio of words in common 612 may be calculated as:

$$\frac{\sum_i \min(\text{count}(q_1, w_i), \text{count}(q_2, w_i))}{\max\left(\sum_j \text{count}(q_1, w_j), \sum_j \text{count}(q_2, w_j)\right)}$$

where count ($q_1$ $w_i$) is the number of occurrences of word w, in a first query $q_1$ and $q_2$ is a second query. Additional edit features may include the absolute difference between the length of the first query and the length of the second query (ldiff), the ratio of the length of the first query to the second query length (lenthratio), and a binary value that is one if a digit is dropped from q1 to q2, and is zero otherwise.

An analysis of the features for predicting goal and mission boundaries, as well as identifying the same goals/missions based on the edit features described with respect to FIG. 6 is shown in Table 2.

TABLE 2

| Edit Distance | Goals | | Missions | |
| --- | --- | --- | --- | --- |
| | Boundary | Same | Boundary | Same |
| Baseline | 63.10% | 94.75% | 59.87% | 70.51% |
| lev | 85.01% | 95.18% | 78.20% | 76.98% |
| wordr | 83.86% | 95.27% | 79.24% | 77.87% |
| wordpov | 77.91% | 94.84% | 59.87% | 73.67% |
| charpov | 80.40% | 94.99% | 68.17% | 73.85% |
| commonw | 80.72% | 94.85% | 79.32% | 78.89% |

Table 2 is an exemplary embodiment of the accuracy of computing a goal boundary, a mission boundary, whether queries have the same goal, and whether queries have the same mission for various features. This may be computed after removing repeated queries and illustrate's that the edit distance (lev) 604 may provide the best accuracy for determining boundaries between goals. Common words (commonw) 610 may perform best for identifying mission boundaries and determining when queries have the same mission. In alternative embodiments, other features may be preferred. In order to compute accuracy, the set of predictions per query pair (a boundary or not, same mission/goal or not) may be compared to the editorial labels for that pair. Over all the query pairs, accuracy may be the number of correct (binary) predictions out of the total number of predictions.

Figure 7:
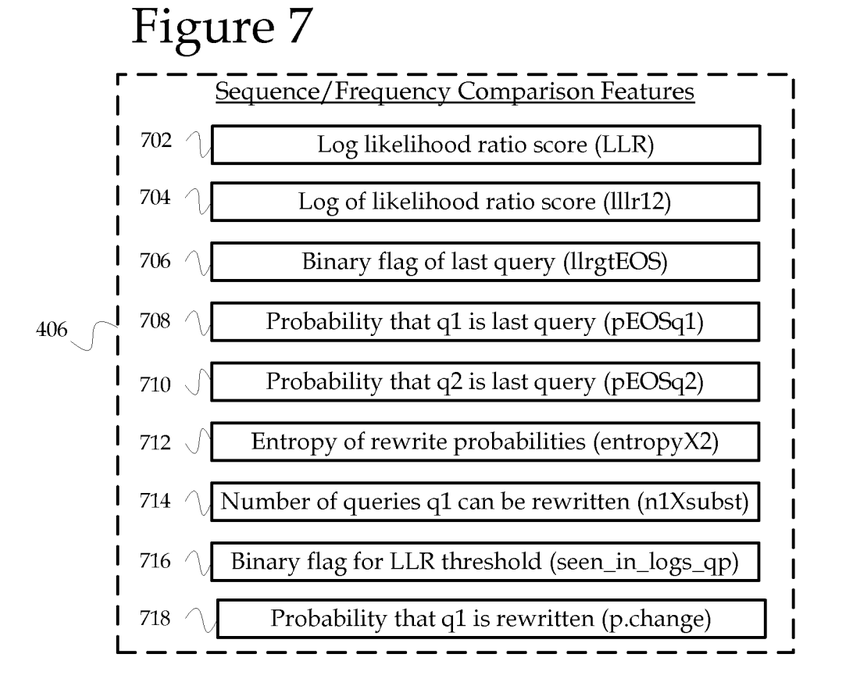
FIG. 7 is a block diagram of exemplary sequence comparison features.

Referring back to FIG. 4, an additional type of features to be analyzed is query log sequence/frequency comparison features 406. FIG. 7 illustrates exemplary sequence/frequency comparison features 406. As discussed above, the edit features 404 may compare the similarities between queries based on differences between the characters and words of the queries. However, the sequence/frequency comparison features 406 may relate to queries that are semantically related without sharing any terms. For example the queries "New York hairdresser" and "Tribeca salon" may be queries from the same goal of attempting to find a hair-stylist in New York City, but they don't share any terms. The identification of a relationship between such queries may be based on a statistical analysis of past search queries to identify whether the queries occur together more frequently than by chance. The frequency that a query pair appears in sequence may be utilized to statistically identify a relationship.

The sequence/frequency comparison features 406 may include a log likelihood ratio score (LLR) 702. The log likelihood ratio score 702 may identify pairs of queries (q1, q2), which may occur in sequence more than would be expected by chance. Subsequent queries which occur in sequence more frequently may be more likely to be related, such as having the same goal and/or same mission. The LLR may determine when the probability of query q2 appearing is increased based on the presences of query q1. In other words, if query q1 has a positive affect on the probability of query q2, then it may be likely that query q2 and query q1 have similar goals and/or missions.

In one embodiment, the hypothesis is tested that the probability of query q2 is the same whether query q1 has been seen or not, by calculating the likelihood of the observed data under a binomial distribution using probabilities derived using each hypothesis. The hypotheses for testing may be:

$H_1: P(q_2|q_1) = p = P(q_2|\neg q_1)$ and $H_2: P(q_2|q_1) = p_1 \neq p_2 = P(q_2|\neg q_1)$.

The likelihood score may be calculated as:

$$\lambda = \frac{L(H_1)}{L(H_2)}.$$

The test statistic $-2 \log \lambda$ may be asymptotically $\chi^2$ distributed under the null hypothesis, so the log of the likelihood ratio score may be used: $LLR = -2 \log \lambda$. A high value for the likelihood ratio may suggest that there is dependence between query q1 and query q2. In other words, a high LLR may be an indication that a pair of queries have a common goal or a common mission. In one embodiment, an LLR score of 70 may be used to remove coincidentally co-occurring pairs of queries. Co-occurring pairs may be present when a user utilizes the back button on a web browser, so such queries are not entered by a user.

The sequence/frequency comparison features 406 may be used to determine probabilities for a query pair as discussed below. The additional features may be utilized to rewrite probabilities for a pair of queries. A log of the log likelihood ratio score 704 may provide information similar to the LLR. A binary flag of a last query 706 may indicate whether a query is more likely to be the last query of the day for a user, or whether a query is more likely to be followed by another query. A probability that a first query is a last query (pEOSq1) 708 and a probability that a second query is a last query (pEOSq2) 710 may be used for determining a probability that the first query and a second query are related. In one embodiment, a query that is likely to be the last query may be less likely to be related to its query pair. An entropy of rewrite probabilities (entropyX2) 712 may relate to a probability that the first query can be rewritten into the second query. Alternatively, an entropy of rewrite probabilities that the second query may be rewritten into the first query (entropyX1) may also be used. The features entropyX1 and entropyX2 may also be identified as entropy_X_q1 and entropy_X_q2, respectively, and the rewriting may be to or from any other query. An entropy of rewrite probability for queries which the first query may be rewritten into may be referred to as entropy_q1_X.

A number of queries that can be rewritten (n1Xsubst) 714 may measure the different queries that the first query can be rewritten into after LLR filtering. Alternatively, the second query may be, rewritten into after LLR filtering for n2Xsubst. A binary feature for LLR threshold (seen_in_logs_qp) 716 may indicate whether a probability that the query pair is related is above an LLR threshold. The LLR threshold may be a value that is indicative that two queries are more likely to be related than to be sequential by chance. A probability that a first query is rewritten (p.change) 718 indicates the frequency with which a user may attempt to rewrite and resubmit a similar query sequentially. For example, a user may submit an identical query to review the initial search results a second time. A feature related to mutual information (mi12) may refer to pointwise mutual information and for events A and B it may be identified as P(A AND B)/[P(A)*P(B)]. One event would be the rewriting of q1 into q2, and the probability of that event may be P(q1→q2). One example of mi12 may be p(q1→q2)[p(q1→X)][p(Y→q2)]. This may be divided by the probabilities that q1 is rewritten as anything, and that anything is rewritten as q2.

An analysis of the features for predicting goal and mission boundaries, as well as identifying the same goals/missions based on the sequence/frequency comparisons described with respect to FIG. 7 is shown in Table 3.

TABLE 3

| | Goals | | Missions | |
| --- | --- | --- | --- | --- |
| Query Log Feature | Boundary | Same | Boundary | Same |
| Baseline | 63.10% | 94.75% | 59.87% | 70.51% |
| pEOSq1 | 63.10% | 94.76% | 65.57% | 70.51% |
| pEOSq2 | 63.10% | 94.76% | 66.36% | 70.51% |
| entropyX2 | 63.10% | 94.76% | 62.40% | 70.51% |
| n1Xsubst | 63.10% | 94.76% | 62.52% | 70.51% |
| seen_in_logs_qp | 62.35% | 94.76% | 59.87% | 70.51% |
| p_change | 67.10% | 94.76% | 59.87% | 70.48% |

The query log features may not predict the goals and missions accurately on their own. Individually, each accuracy may be relatively low. However, in conjunction with other types of features, the query log features may improve accuracy, by capturing cases which the edit distances may not handle well.

Figure 8:
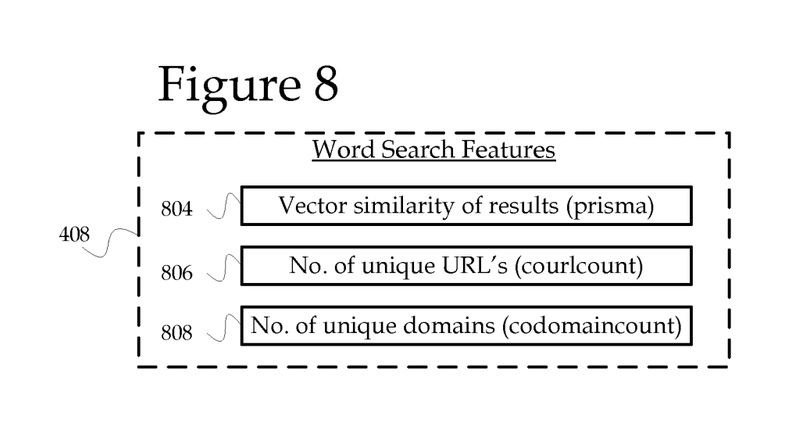
FIG. 8 is a block diagram of exemplary word search features.

Referring back to FIG. 4, additional types of features to be analyzed are search result features 408. FIG. 8 illustrates exemplary search result features 408 which may depend on the documents retrieved by the search engine for the queries. The similarity may be measured between search results based on common terms or characteristics. Two queries whose search results are similar may be more likely to have a similar goal and/or mission. In one embodiment, the vector similarity 804 may be derived from the first 50 search results for the query terms. Alternatively, different search results may be compared for the query terms. The number of unique universal resource locators (URL) 806 and the number of unique domains 808 may also be used to determine similarity. For example if two queries have a number of unique URL's in common, then those queries may be more likely to be related.

An analysis of the features for predicting goal and mission boundaries, as well as identifying the same goals/missions based on the word search features described with respect to FIG. 8 is shown in Table 4.

TABLE 4

| Web Search Feature | Goals | | Missions | |
| --- | --- | --- | --- | --- |
| | Boundary | Same | Boundary | Same |
| Baseline | 63.10% | 94.75% | 59.87% | 70.51% |
| Prisma Score | 78.52% | 94.75% | 77.14% | 73.00% |
| codomaincount | 65.31% | 94.75% | 59.87% | 70.51% |
| courlcount | 65.31% | 94.75% | 59.87% | 70.51% |

As shown, the Prisma Score feature may provide an accurate determination of boundaries between goals and missions. The Prisma score may be derived from a cosine similarity distance computed between the vectors of terms in the documents of the top search results (such as the first 50 results) returned for each query. Prisma may use a dictionary to specify which terms in the search results pages enter into the computation.

Referring back to FIG. 3, the feature analyzer 304 is coupled with the identifier 306. Based on the analysis of features by the feature analyzer 304, the identifier 306 may identify whether queries have the same goal and/or same mission for a query. In addition, the identifier 306 may identify a goal boundary or a mission boundary between sequential queries. In one embodiment, all queries from a session are received by the receiver 302 and analyzed by the feature analyzer 304. Each sequential pair of queries is analyzed and goal boundaries and mission boundaries are identified between pairs of queries by the identifier 306. The boundaries may be identified by detecting whether there was a change from one query to the next sequential query. The change may be determined or measured by any of the features, such as the edit distance. For example, when the normalized edit distance is very high, it may be more likely that there is a goal boundary between queries. Any of the features discussed above with respect to FIGS. 4-8 may be utilized for identification of goals and/or missions. In one embodiment, the edit distance 604 is utilized to eliminate repeated queries and used with the log-likelihood ratio score to identify similarities between query pairs. In one embodiment, a decision tree may be used for learning to predict goal and mission boundaries with no repeated queries. For example, the features may be considered using Akaike Information Criteria (AIC) for logistic regression.

Figure 11:
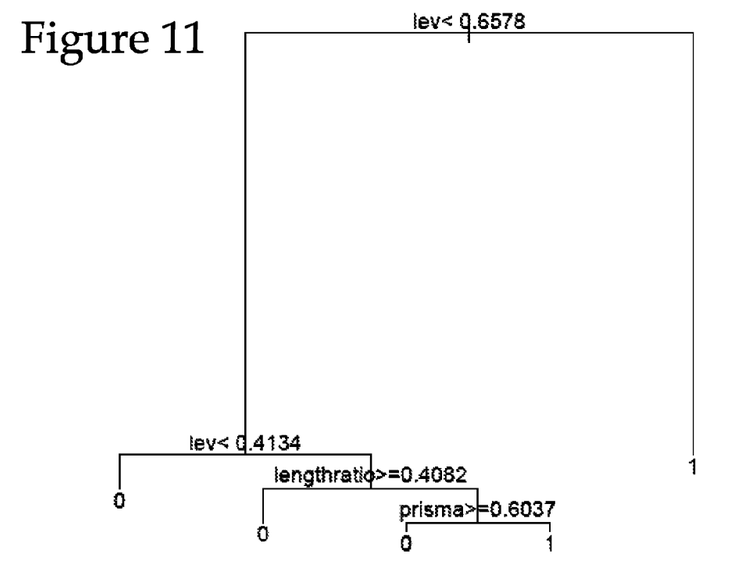
FIG. 11 is a diagram illustrating an exemplary decision tree.
Figure 12:
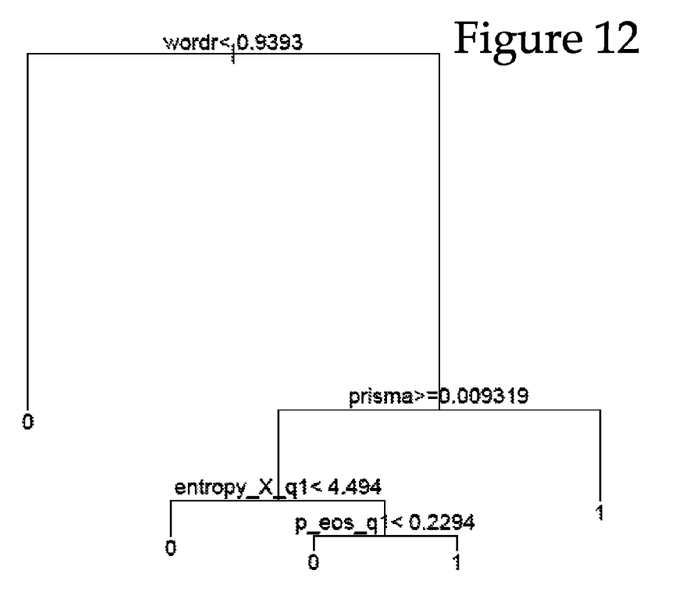
FIG. 12 is another diagram illustrating an exemplary decision tree.

In one example, the identification of goal boundaries may be made using a decision tree with lev, lengthratio, and prisma. FIG. 11 illustrates an exemplary decision tree for identification of a goal boundary. It illustrates the features that produce a binary value. As shown, when lev<0.6578, the value is 1. When lev>0.6578 and lev<0.4134, then the value is 0. The decision tree illustrated by FIG. 11 for goal boundary identification is merely exemplary. The identification of mission boundaries may be made using a decision tree with wordr, prisma, entropy_X_q1, and peos_q1 as illustrated in the exemplary tree diagram shown in FIG. 12. The identification of same mission may be made with a decision tree using commonw, time_diff, digitdrop, n1Xsubst, wordr, and n2Xsubst. The identification of same goal may be made with a decision tree with wordr, lev, entropy_q1_X, prisma, time_diff, word_suf, char_suff, Idiff, mil2, and commonw.

Figure 9:
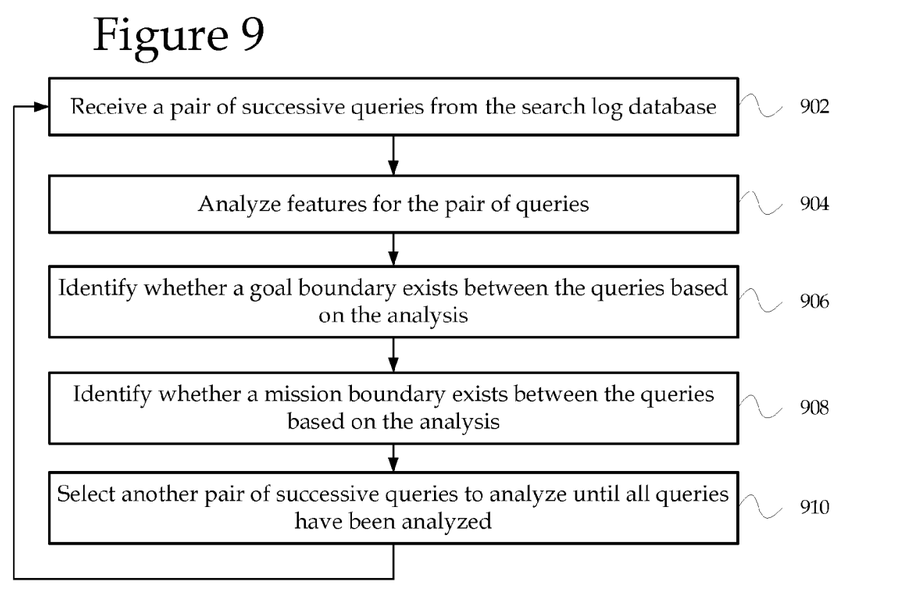
FIG. 9 is a flow diagram illustrating boundary identification.

FIG. 9 is a flow diagram illustrating boundary detection. In block 902, a pair of successive queries may be received from the search log database 212. The successive queries may be received at the search engine 202 or at the segmenter 204. In one embodiment, repeated queries are removed from the analysis/comparison. In block 904, the features of each of the pair of queries are analyzed and compared. The comparison may be performed by the feature analyzer 304 and the features that may be compared may include those features described with respect to FIGS. 4-8. In alternative embodiment, more or fewer features may be utilized. In block 906, a goal boundary is identified between the pair of queries based on the feature analysis. In block 908, a mission boundary is identified between the pair of queries based on the feature analysis. In one embodiment, a goal boundary or a mission boundary are not present when the pair of queries exhibit similarities based on the features. There may be multiple thresholds to determine whether queries are related as part of the same goal, or whether queries are related as part of the same mission. The threshold for being part of the same goal may be higher and require more similarity than the threshold for being part of the same mission. In block 910, an additional pair of successive queries is selected for determining whether a goal/mission boundary exists between that pair of queries.

Figure 10:
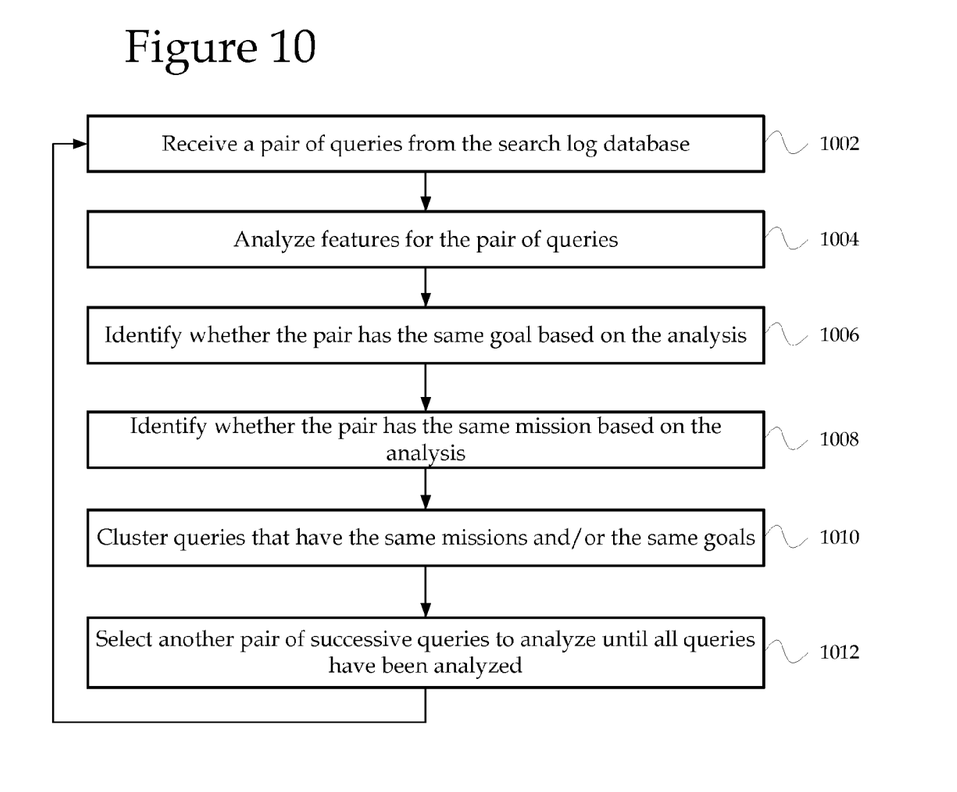
FIG. 10 is a flow diagram illustrating same goal/mission identification.

FIG. 10 is a flow diagram illustrating same goal/mission detection. Same-goal or same-mission may refer to identifying whether queries have the same goal or the same mission. In block 1002, a pair of queries is received from the search log database 212. In block 1004, features of the pair are analyzed by the feature analyzer 304 regarding any of the features described with respect to FIGS. 4-8. In block 1006, the identifier 306 may determine whether the pair has the same goal based on the feature analysis. Likewise, in block 1008, the identifier 306 may determine whether the pair has the same mission based on the feature analysis. In block 1010, non-sequential queries that have the same mission may be clustered together and non-sequential queries that have the same goal may be clustered together. The clustering may be used to identify all queries that were part of a particular mission or goal. In block 1012, an additional pair of queries is selected for determining whether the pair of queries has the same goal or the same mission.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for segmenting a session of queries comprising:
   a search log database operative to store search queries; and
   a segmenter coupled with the search log database, the segmenter further including:
      a receiver operative to receive a pair of queries from the search log database;
      a feature analyzer coupled with the receiver and operative to compare the pair of queries based on at least one feature; and
      an identifier coupled with the feature analyzer and operative to identify a goal boundary between the pair of queries when the at least one feature of the pair of queries indicates a change between the pair of queries;
   wherein the receiver is further operative to receive additional successive pairs of the stored search queries for identifying goal boundaries in the session of queries.

2. The system according to claim 1 further comprising a search engine coupled with the search log database and the segmenter and operative to receive a user query, wherein the user query is stored in the search log database.

3. The system according to claim 1 wherein the goal boundary establishes a segment of queries with a similar goal.

4. The system according to claim 3 wherein the change indicates that a successive pair of queries have different goals.

5. The system according to claim 1 wherein the identifier is further operative to identify a mission boundary between the pair of queries when the at least one feature of the pair of queries indicates a change between the pair of queries, wherein the mission boundary establishes a segment of successive queries with a similar mission.

6. The system according to claim 5 wherein a goal is a subset of a mission in hierarchical classification of user intent, wherein the mission is a first level of intent and the goal is a second level of intent.

7. The system according to claim 1 wherein the change comprises a difference in the at least one feature between the successive pair.

8. The system according to claim 1 wherein the at least one feature comprises an edit distance comparison between the one of the successive pairs.

9. The system according to claim 8 wherein the change comprises a high value for a normalized value of the edit distance.

10. The system according to claim 8 wherein the edit feature comprises a Levenshtein edit distance.

11. The system according to claim 10 wherein the goal boundary is identified between successive queries when a normalized value of the Levenshtein edit distance is above a threshold value.

12. The system according to claim 1 wherein the at least one feature comprises at least one of a temporal feature, a character prefix overlap, a word prefix overlap, a common words feature, a ratio of common words feature, a log likelihood ratio score, a probability that a query is the last query, a vector similarity, or a number of unique domains.

13. A system for segmenting a session of queries comprising:
   a search log database operative to store search queries; and
   a segmenter coupled with the search log database, the segmenter further including:
      a receiver operative to receive a pair of queries from the search log database;
      a feature analyzer coupled with the receiver and operative to compare the pair of queries based on at least one feature; and
      an identifier coupled with the feature analyzer and operative to identify a goal boundary between the pair of queries when the at least one feature of the pair of queries indicates a change between the pair of queries, wherein the identifier is further operative to identify a mission boundary between the pair of queries when the at least one feature of the pair of queries indicates a change between the pair of queries, wherein the mission boundary establishes a segment of successive queries with a similar mission.

14. The system according to claim 13 wherein a goal is a subset of a mission in hierarchical classification of user intent, wherein the mission is a first level of intent and the goal is a second level of intent.

15. The system according to claim 14 wherein the goal and the mission are hierarchical categories of the task, and further wherein the mission is a broad task and the goal is a specific task.

* * * * *